(No Model.)

L. A. GRUBER.
ANTIFRICTION PACKING.

No. 567,233.

Patented Sept. 8, 1896.

Witnesses:
A. R. Appleman Jr.
A. M. Wilson

Inventor.
Louis A. Gruber.
By N. C. Evert, Atty.

UNITED STATES PATENT OFFICE.

LOUIS A. GRUBER, OF PITTSBURG, PENNSYLVANIA.

ANTIFRICTION PACKING.

SPECIFICATION forming part of Letters Patent No. 567,233, dated September 8, 1896.

Application filed November 30, 1895. Serial No. 570,607. (No model.)

*To all whom it may concern:*

Be it known that I, LOUIS A. GRUBER, a citizen of the United States of America, residing at Pittsburg, in the county of Allegheny and State of Pennsylvania, have invented certain new and useful Improvements in Antifriction Packing, of which the following is a specification, reference being had to the accompanying drawings.

This invention relates to certain new and useful improvements in packing, and has for its object the provision of new and novel means whereby an antifriction packing may be provided.

A further object of the invention is the construction of an antifriction packing as above described, whereby the packing constructed in accordance with my invention will be prevented from burning out, as is now often the case, and thereby causing much inconvenience and expense; furthermore, a packing that will be much more durable than the ordinary construction.

A still further object of the invention is the construction of an antifriction packing that will effectually prevent the escape of steam from the cylinder, even when the packing is comparatively loose, and that will also prevent wear on the piston-rod.

With the above and other objects in view the invention finally consists in the novel construction, combination, and arrangement to be hereinafter more specifically described, and particularly pointed out in the claim.

In describing the invention in detail reference is had to the accompanying drawings, forming a part of this specification, and wherein like figures of reference indicate similar parts throughout the different views, in which—

Figure 1:
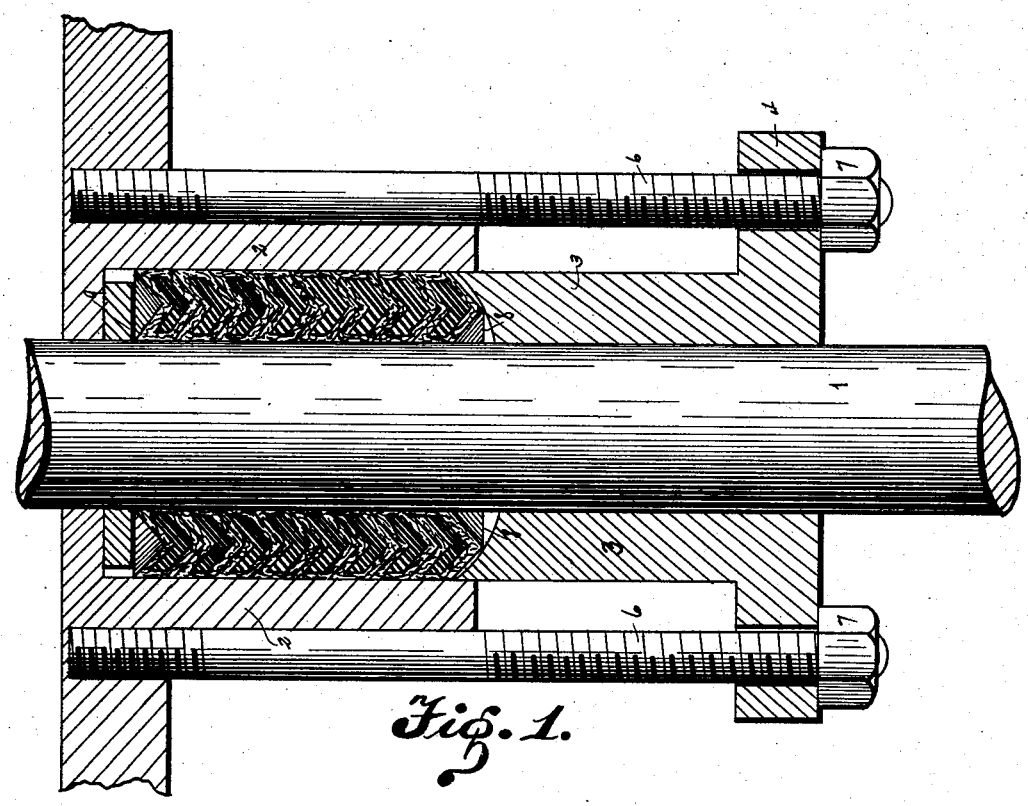
Figure 2:
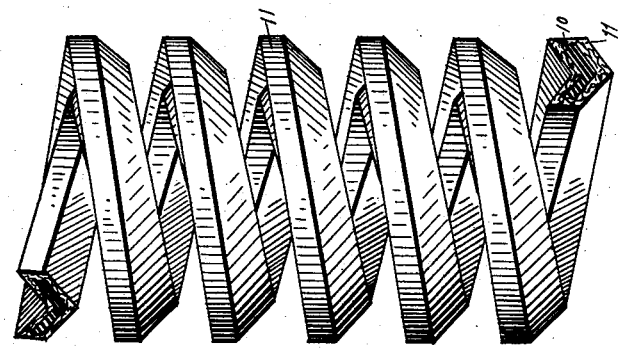

Figure 1 is a sectional view of stuffing-box and follower, showing the packing in position on a piston-rod. Fig. 2 is a detail view of a section of my improved packing.

In the drawings, 1 indicates the piston-rod; 2, the stuffing-box, and 3 the follower, which is provided with lugs 4 4 for securing to bolts 6 6, carrying nuts 7 7. The end of the follower is formed in bell shape, as shown by reference-figure 8 in Fig. 1 of the drawings. A collar 9 is provided on the piston-rod, and the packing is composed of a rubber or other resilient material 10, provided with a covering 11, of asbestos or other suitable material.

The packing may be formed either in V shape or in a semicircle, and is also adapted to be constructed in a coil, as shown in Fig. 2 of the drawings.

The operation of my improved antifriction packing will be readily apparent.

The packing having been constructed in the shape and manner as described, is coiled around the piston-rod 1 between the collar 9 and the follower 3, and engages the bell-shaped groove 8 of the follower 3, as shown in Fig. 1. As the steam engages the piston-head and operates the piston-rod the packing, by reason of its resiliency, will readily adapt itself, and will engage the piston-rod at all times and effectually prevent the escape of steam.

When the packing has become worn, the nuts 7 7 can be tightened, thereby forcing the packing more firmly around the piston-rod. This can readily be accomplished when the engine is in operation, if necessary, as, there being no strain on the bolts, the nuts 7 7 can readily be adapted with the fingers without the aid of a wrench.

When the packing has been secured on the piston-rod in the manner described, it will be noticed that a perfectly smooth surface is presented to the rod, allowing the same to operate through the packing easily and without any friction on both the forward and backward stroke of the rod.

By the use of my improved packing it will be apparant that the friction in the stuffing-box is to a very great extent obviated, thereby increasing the efficiency of the engine and permitting of a greater number of revolutions per minute than is obtained when the ordinary packing is used.

I wish to call particular attention to the fact that my improved antifriction packing being constructed in the manner described, it will readily adjust stself to the piston-rod at all times, even when the engine is out of alinement, thus forming at such a time a perfectly steam-tight cylinder, which is not obtainable under similar circumstances with the ordinary packing, and it will also be noticed that by use of the gland or follower, as shown, for adjusting the packing the bell-shaped end of same will tend to keep the packing adjusted properly to the rod.

I also wish to call attention to the fact that the packing being constructed in this manner, and of the materials as described, will in no manner cut or wear the piston-rod, and will also last a much greater length of time than the ordinary packing, as even after the packing has become worn this construction will enable its being adjusted to the rod to form a steam-tight cylinder.

I also call attention to the fact that should the follower or gland become loose and out of engagement with the stuffing-box the construction of the packing will allow it to expand sufficiently to close the aperture thus formed, and it will not blow out, but will still keep the compartment steam-tight, which would not be the case were the ordinary packing used.

It will be noticed that various changes may be made in the details of construction without departing from the general spirit of my invention.

Having fully described my invention, what I claim as new, and desire to secure by Letters Patent, is—

Antifriction packing consisting of a coil formed from a body composed of a core of rubber and a covering of asbestos, said packing being V-shaped and having its edges so beveled to engage the piston-rod when wound in position, as and for the purpose described.

In testimony whereof I affix my signature in presence of two witnesses.

LOUIS A. GRUBER.

Witnesses:
H. E. STEIBER,
ALFRED M. WILSON.